(12) United States Patent  (10) Patent No.: US 6,466,127 B1
Martin  (45) Date of Patent: Oct. 15, 2002

(54) LOW-TIRE INDICATOR FOR WHEELED VEHICLES

(76) Inventor: Clarence A. Martin, P.O. Box 10113 2900 Harmony, Amarillo, TX (US) 79106

(*) Notice: Subject to any disclaimer, the term of this patent is extended or adjusted under 35 U.S.C. 154(b) by 0 days.

(21) Appl. No.: 09/844,126

(22) Filed: Apr. 26, 2001

(51) Int. Cl.⁷ .............................................. B60C 23/00
(52) U.S. Cl. ...................................... 340/443; 340/442
(58) Field of Search ................................ 340/443, 444, 340/445, 442

(56) References Cited

U.S. PATENT DOCUMENTS

| | | | | |
|---|---|---|---|---|
| 2,639,342 A | * | 5/1953 | Cope | 200/58 |
| 2,640,119 A | * | 5/1953 | Bradford, Jr. | 200/58 |
| 2,740,007 A | * | 3/1956 | Amelang | 200/61.24 |
| 3,096,410 A | * | 7/1963 | Anderson | 200/61.24 |
| 3,265,822 A | * | 8/1966 | Moulton | 200/61.24 |
| 3,502,829 A | * | 3/1970 | Reynolds | 200/61.24 |
| 3,602,885 A | * | 8/1971 | Grajeda | 340/58 |
| 4,075,602 A | * | 2/1978 | Clothier | 340/58 |
| 4,554,528 A | * | 11/1985 | Burkel et al. | 340/58 |
| 5,327,116 A | * | 7/1994 | Davidson | 340/443 |
| 5,520,045 A | * | 5/1996 | Edri | 73/146 |

* cited by examiner

*Primary Examiner*—Jeffery Hofsass
*Assistant Examiner*—Son Tang
(74) *Attorney, Agent, or Firm*—Samuel Brown Silverman

(57) ABSTRACT

The present invention, in certain embodiments, is an apparatus to indicate the presence of an under-pressurized pneumatic tire for a vehicle, including, trailers, tractors, trucks or passenger vehicles. The apparatus comprises a housing, a cap, a shaft, a probe element, a bracket, an electrical switching element an electrically powered alarm. The housing is mounted next to the axle for the wheel of the vehicle. The cap is attached to the housing and has an aperture to receive the shaft. The shaft extends through the cap, and at one end, receives the probe element, and at the other end, holds the bracket upon which the electrical switching element is attached. When a tire loses air pressure, the height of the tire, as well as the vertical distance from the axle to the travelling surface, decreases; as the vertical distance decreases, the probe element contacts the travelling surface and rotates the shaft, bracket and electrical switch. The electrical switch and bracket contact a retaining element, which in certain embodiments is either part of the cap or part of the housing. The contact of the retaining element with the bracket prevents the electrical switch from being subjected to force in excess of what is necessary to activate the switch. When the electrical switch contacts the retaining element, at least one electrically powered alarm is activated thus notifying the operator of the vehicle of the deflated tire.

21 Claims, 5 Drawing Sheets

LOW-TIRE INDICATOR FOR WHEELED VEHICLES

1. FIELD OF INVENTION

The present invention relates to an indicator system which advises an operator or driver of the deflation of one or more pneumatic tires on a wheeled vehicle, and more particularly, in certain aspects, an indication device comprising a road-surface-contacting probe, which when engaged, activates an alarm to warn an operator or driver of a deflating tire.

2. DISCLOSURE DOCUMENT FILING REFERENCE

This invention was the subject of U.S. Patent Office Disclosure Document Number 461610, filed Sep. 5, 1999, entitled, LOW-TIRE INDICATOR FOR WHEELED VEHICLES.

3. BACKGROUND OF THE INVENTION

Most wheeled vehicles on the road today employ pneumatically-inflated tires. Although tubeless pneumatic tires are superior to former tube-type pneumatic tires in many respects, tubeless pneumatic tires develop slow leaks and, when a complete tire failure occurs, deflate more quickly. Because the seal between the wheel rim and tire may be incomplete, due to deformation of the wheel rim or imperfections or deformations in the tire, air leaks from the tire.

Pneumatic tires require proper inflation to support the vehicle in transport. Proper inflation is required for evenly distributing the wear and heat suffered by a tire in the course of travel along a road. In the course of travel along a road, the shape of a tire changes: the shape of the tread changes as a tire rolls on a road surface; as the tread changes shape in its contact and departure from the road surface, the tire walls flex. As the walls of a tire flex, the seal between the rim of the wheel and the pneumatic tire can be compromised, thus causing a loss of air pressure within the tire. As the air pressure decreases, the flexing of the tire worsens. While a certain flexing at proper-operation air pressure is contemplated when a tire is designed, excessive flexing of the tire shape generates excessive heat and wears excessively tire components. Excessive heat and wear can cause tire deflation or failure. As a tire loses air pressure or fails altogether, the height of the tire diminishes, and the distance the vehicle or trailer rides above the road also decreases.

Vehicles can be, and are, operated with one or more of the pneumatic tires in a deflated position without the driver of the vehicle being aware of the danger caused by the deflated tire condition. Furthermore, it is common for vehicles to have multiple sets of tires with varying loads, capacities and pressures according to the demands upon the vehicle involved.

As a result of these conditions, the deflation, degradation and catastrophic loss of air pressure—a blow out—of tire are common, although dangerous, events. When a complete tire failure occurs, various vehicle components, including the tire itself, wheel rim, assembly and vehicle body components can be damaged. Frequently, when a tire fails, the undercarriage or body of the trailer falls and is dragged, and the resulting damage is generally very expensive. The resulting damage to the vehicle and trailer can be extreme and entail large repair expense. It is also frequently the case that when one tire fails, the weight on a second tire exceeds its weight limit and causes a failure as well. In that case, the damage to an entire side of a trailer can be occasioned. Furthermore, the driving hazard associated with towing—then dragging—a trailer with one or more tire failures at cruising speeds is a road safety hazard, not only to the towing vehicle and its occupants, but to the other motorists and vehicles on the road.

Thus, proper inflation of the tires affects not only the performance, but the longevity of the trailers, tractors, trucks or passenger vehicles and, foremost, the safety of travel.

Because the driver of the towing vehicle is usually unable to easily ascertain when the trailer has suffered a blow-out or whether a tire has lost air pressure, the need exists for a low-tire pressure warning system which may be readily mounted on various forms of vehicles to indicate to an operator when one of the pneumatic tires has become deflated or failed. Until this invention, there was no similar cost-effective apparatus which remotely monitors tire pressure by measuring the elevation of a vehicle or its trailer while in transit.

4. DESCRIPTION OF RELEVANT PRIOR ART PATENTS

Low-tire warning systems and structures in certain prior art embodiments describe and claim specific structures.

U.S. Pat. No. 5,583,481 (Gardner) describes a low-tire warning system with a rod which is mounted in a rubber insulator. When a tire deflates, the electrical spring actuator (27), as part of the sensor switch, bends and contacts an exposed metallic cylinder thus closing the switch and completing an electric alarm circuit. Furthermore, the claims of the Gardner patent cover only two lights on the panel—one to indicate that the system is on and the second to apprise the operator that a tire—and not which tire—is deflated.

U.S. Pat. No. 5,327,116 (Davidson) describes a low-tire detection device with specific structural elements, notably the ground-contacting resilient sensor rod (32). The claims specifically identify that the initial position of the probe is biased forward at a slight angle to the vertical in the direction of movement of the tire. Furthermore, the flex contact (68) of the electrical control switch (64) is directly engaged by the rotary motion of the rod (32).

U.S. Pat. No. 5,032,822 (Sweet) describes a tire deflation warning system with specific structural elements, notably a vertically disposed post. As a tire deflates, wheels (30) at the end of the post contacts the road surface (13), the post should move upward, and a pedestal contacts an activator means to complete an electrical circuit, thus activating an alarm. The only rotary motion described is by the wheels (30); otherwise, the actuation of the alarm is effected by vertical motion of the elements of the invention.

U.S. Pat. No. 4,187,495 (Mitchell) is a low tire pressure warning system which features a laterally-deflecting probe, identified as wobble actuator (14) to detect a lateral protuberance in a deflated tire. As the tire pressure decreases, the lateral protuberance expands thus contacting the wobble switch actuator (14). The wobble switch actuator (14), in turn, as a part of the switch, closes the electrical circuit and engages the audible signal generator (26).

U.S. Pat. No. 3,413,598 (Uphoff) employs a probe which contacts the road, bends backwards, and one end of the probe engages the push-switch to activate the alarm.

U.S. Pat. No. 2,258,334 (Miller) describes a probe, one end of which is part of the switch encased in an insulating material. When the probe is flexed, one end of the probe moves to close the electrical circuit. The cup-shaped bracket and the use of the large insulated leg also serve as the flexing component.

U.S. Pat. No. 2,191,205 (Rogers) employs a leg, mounted by a pivot onto a bracket. When the downwardly-extending leg is moved, a pivotally-mounted arm moves to close the electrical switch contact.

Some prior patent art suggests that a probe element that points forward into the general direction of travel is preferable, but in a catastrophic loss of tire pressure or the instantaneous destruction of the tire, it is possible for the forward-pointing probe to ride along the travelling surface, thus not rotating to engage the switching element and alarm; thus, failing to inform the operator of the tire failure while further damage ensues.

Some prior patent art uses its probe element to measure the lateral displacement of the bulge at or near the travelling surface in contact with the pneumatic tire caused by a loss of air pressure. A tire may have lateral motion due to reasons other than loss of air pressure; furthermore, a blown out tire will have no lateral bulge to measure at all.

Additionally, the prior art teaches that the probe, be it a ground-contacting or tire-contacting element, directly engages the switch or is an element that completes the electrical circuit. The probe is subjected to a wide variety of harsh forces; in the prior art, the electrical switching elements are therefore subjected to the abrupt and destructive forces the ground-contacting element suffers.

5. SUMMARY OF THE INVENTION

The present invention relates to an indicator which advises an operator or driver of the deflation of a tire on a wheeled vehicle, and more particularly, in certain aspects, an indication device consisting of a road-surface-contacting probe, which when engaged, activates an alarm to warn an operator or driver of a malfunctioning tire.

This invention, entitled a low-tire indicator for wheeled vehicles, comprises: (1) a probe element with a first end and a second end; (2) a shaft, with a first end and a second end, the first end of the shaft being attached the first end of the probe; (3) a bracket, attached to the second end of the shaft; (4) an electrical switching element mounted upon the bracket; (5) a cap, with an interior and an aperture, which aperture holds the shaft between the first end of the shaft and the second end of the shaft; (6) at least one retaining element attached to either the interior of the cap or the interior of the housing for engaging the bracket and electrical switching element; (7) a housing, with an interior, an exterior, a mounting base and a cap-receiving opening, upon which cap receiving opening the cap is mounted and in which interior the electrical switching element, bracket and at least one retaining element are housed and upon which mounting base an attachment to the axle or other component of a vehicle or trailer is made; and, (8) an alarm electrically attached to the switching element.

The main object of this invention is to provide a low-pressure warning system including visual and audible signal generators actuated in response to the sensing of low tire pressure.

A further object of this invention is to provide a low tire pressure warning system which may be utilized on operator-driven vehicles as well as on vehicles trailed behind operator-driven vehicles.

A further object of this invention to provide a system in accordance with the preceding objects readily adapted for use on vehicles having tires of different sizes.

A further object of this invention is to provide a low tire pressure warning system which may be easily installed on to various forms of vehicles after their manufacture.

A further object of this invention is to provide a low tire pressure warning system of simple, durable construction and operation amenable to low-cost manufacture.

These and other objects and advantages of the present invention, as well as details of the preferred embodiment thereof will be more fully understood from the following description and the drawings.

6. BRIEF DESCRIPTION OF THE DRAWING

7. DESCRIPTION OF CERTAIN PREFERRED EMBODIMENTS

Figure 1:
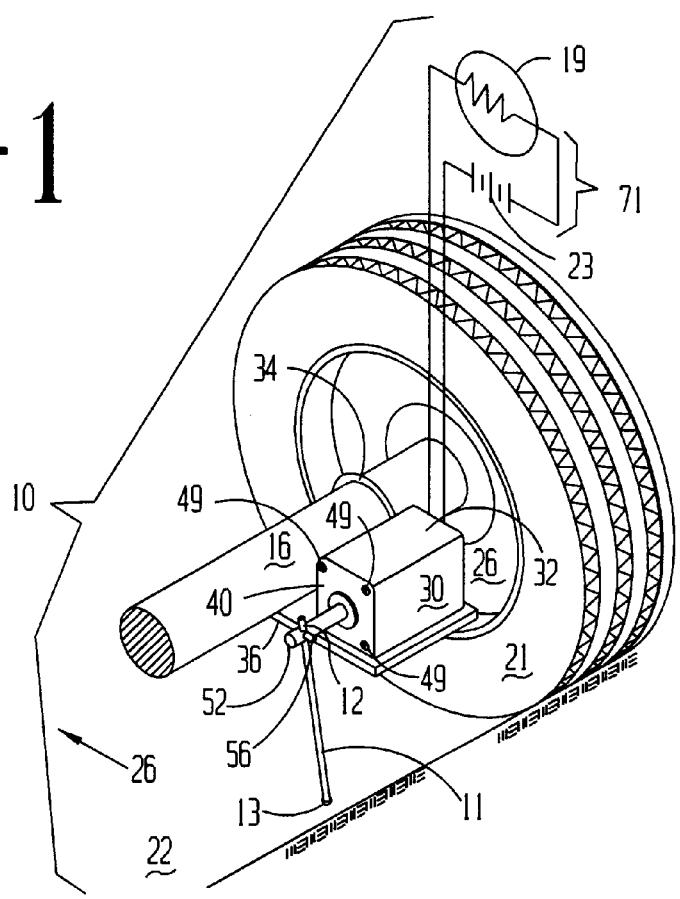
FIG. 1 is an isometric drawing of the invention mounted on the side of a vehicle axle showing the relationship of the elements of the invention to the elements of the vehicle and the travelling surface.
Figure 2:
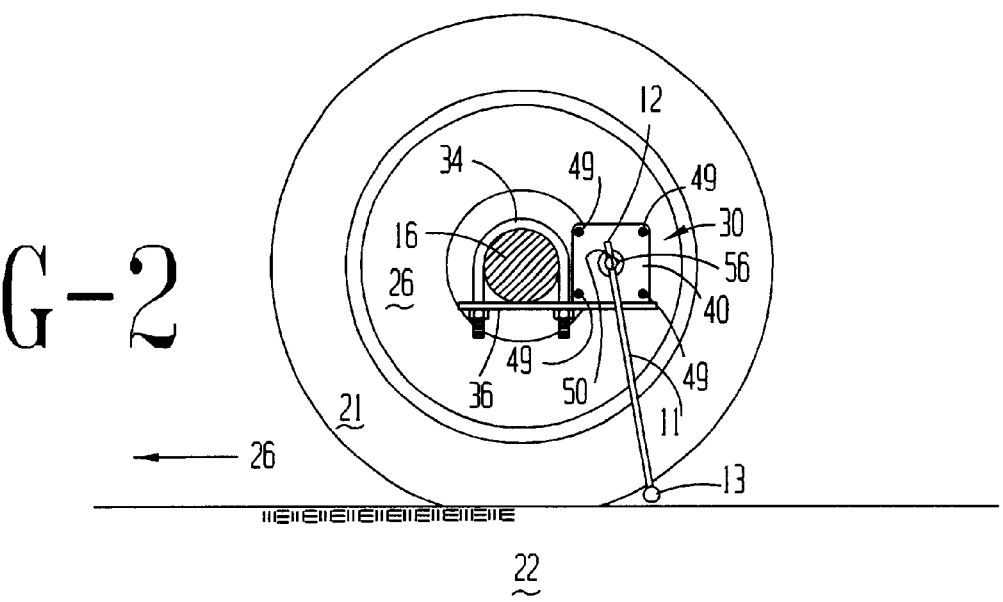
FIG. 2 is a side view of the invention.
Figure 3:
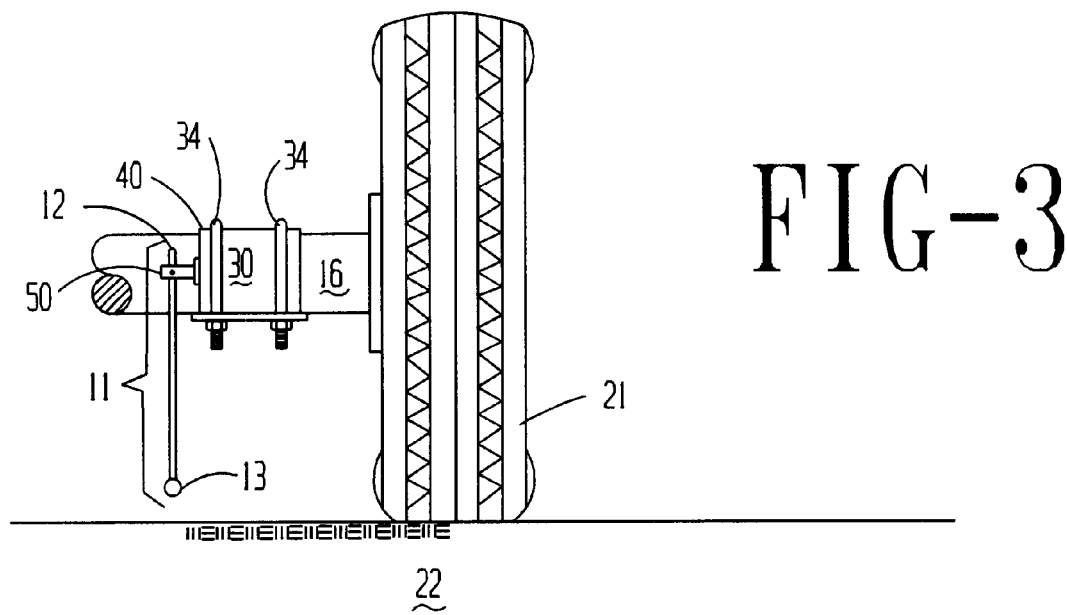
FIG. 3 is a rear view of the invention.

This invention, in certain aspects, is an apparatus (10) to indicate the presence of under-pressurized pneumatic tire (21). Generally, one or more pneumatic tires (21) support a vehicle (17) upon a travelling surface (22), such as a road. The pneumatic tire (21) is mounted on a wheel (26); the wheel (26), in turn, is mounted on an axle (16); the axle (16) is integral to the vehicle (17). Additionally, the wheel (26) rotates on the axle (16) in a plane of rotation.

While a vehicle (17) may travel both forward and backward, the vehicle (17) moves in a generally forward direction of travel (25).

As shown in the drawings, this apparatus (10), in certain aspects, employs a housing (30) with an interior (31), exterior (32), a mounting base (36), and an opening (33) for receiving a removable and replaceable cap (40). The housing (30) is adapted to be positioned next to the axle (16) for the wheel (26) of the vehicle (17). The mounting base (36) extends beyond one side of the exterior (32) of the housing (30). The mounting base (36) is adapted to receive mounting means (34) for fixable attachment of the housing (30) upon the axle (16) of a vehicle (17). For purposes of this invention, in certain embodiments, the term axle (17) includes the wheel-mounting assembly of a front-wheel-drive-train-driven vehicle. In certain embodiments, the mounting means (34) is at least one C-shaped clamp which wraps around the exterior surface of the cover to the axle (16) and is attached to the mounting base (36) of the housing (30). Furthermore, in certain embodiments, the housing (30) and cap (40) are made of an electrically non-conductive material, such as plastic. Additionally, in certain embodiments, the housing (30) and cap (40) further comprise a resilient sealing means (35) for hermetically sealing the interior (31) of the housing (30) and the interior (41) of the cap (40) to protect the components, including electrical switching element (14), within the interior (31) of the housing (30).

Figure 4:
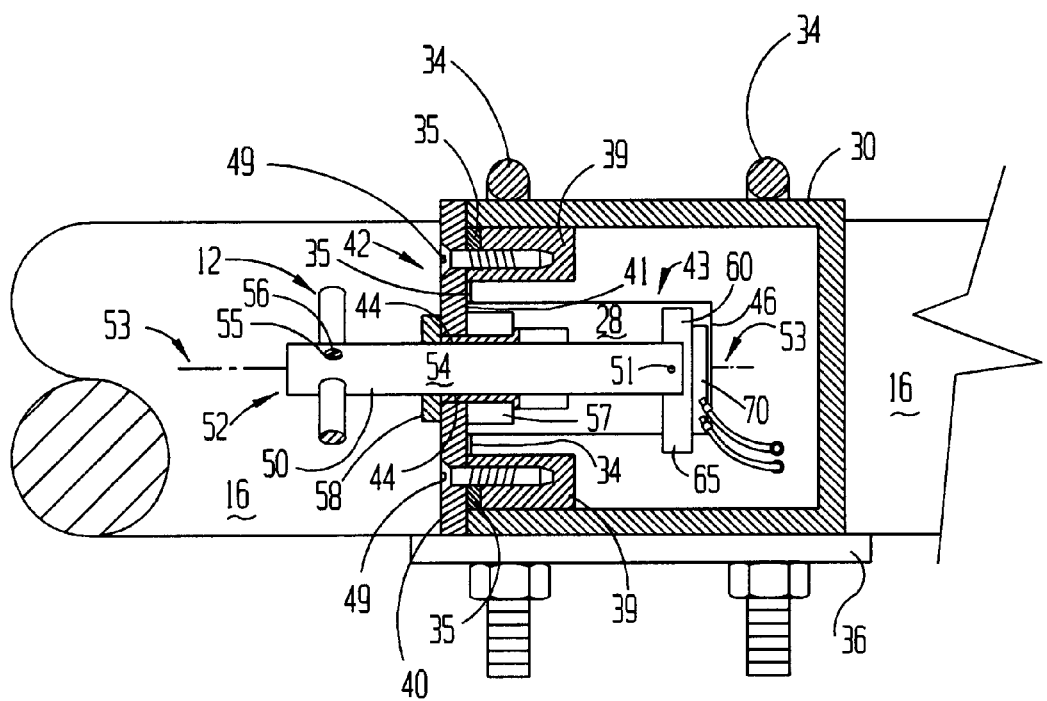
FIG. 4 is a cross-sectional view of the invention, as seen from the rear.
Figure 5:
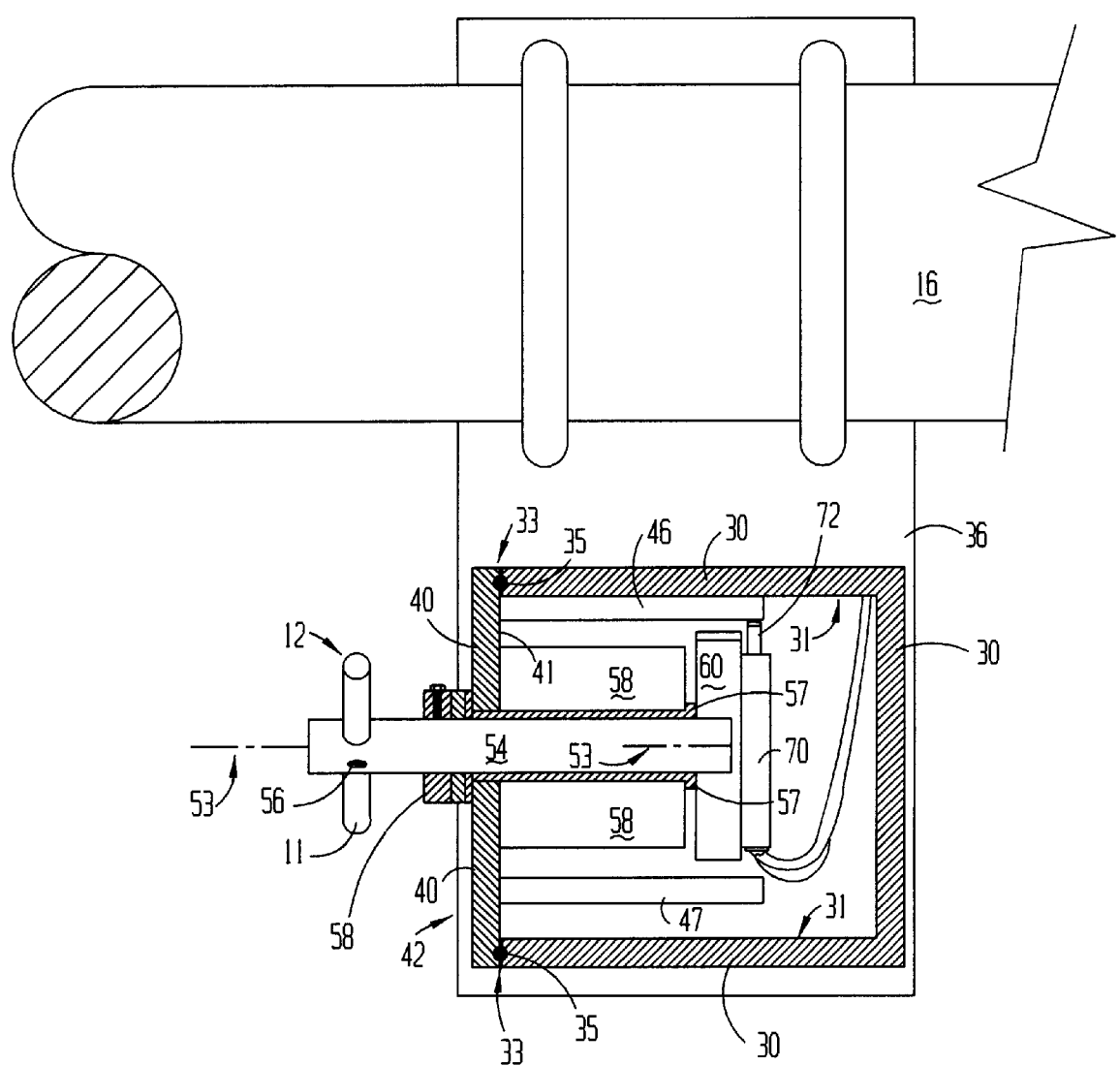
FIG. 5 is a cross-sectional view of the invention, as seen from the top.
Figure 7:
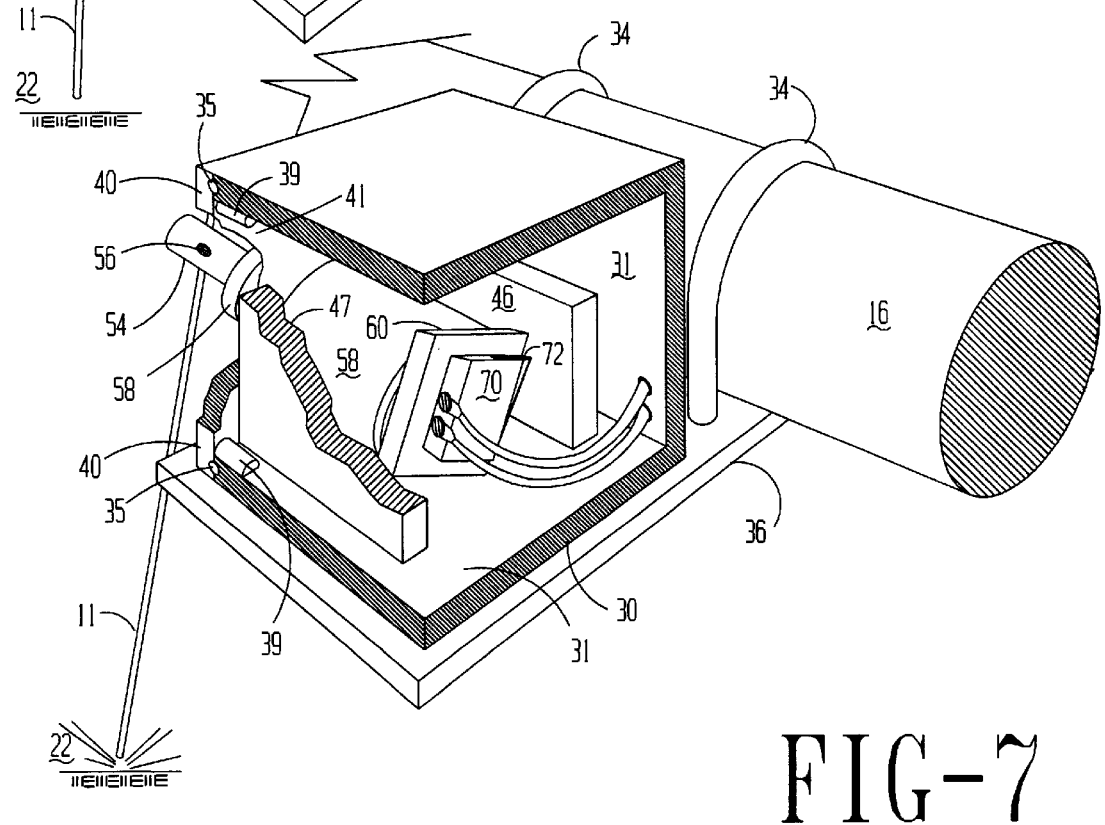
FIG. 7 is an isometric cut-away view of the details of the housing cap, detailing the relationship of the switch, mounting brackets, retaining elements and probe mounting shaft when the apparatus has engaged the travelling surface.
Figure 8:
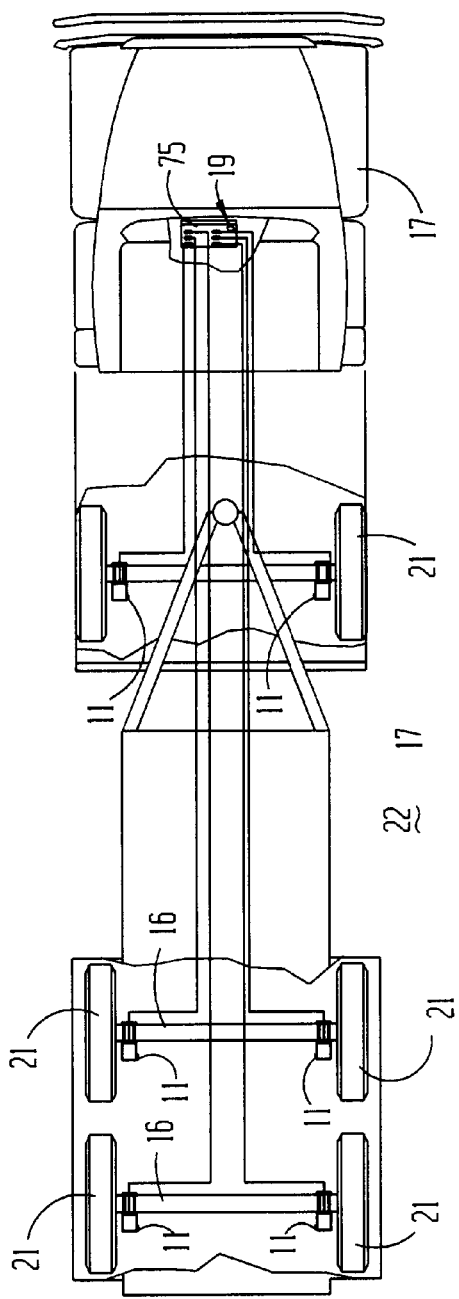
FIG. 8 is a diagram of the placement of the elements of the apparatus on a vehicle towing a trailer.
Figure 9:
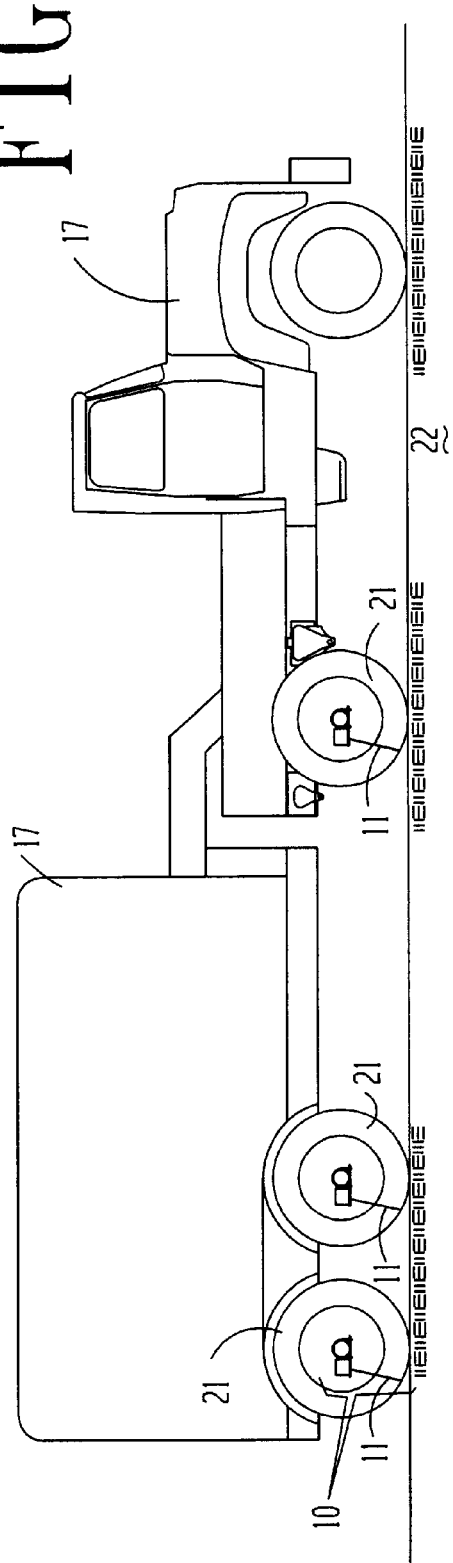
FIG. 9 is a side view diagram of the placement of the elements of the apparatus on a vehicle towing a trailer.

The removable and replaceable cap (40) has an interior (41) and an exterior (42) and is sealably mounted upon the opening (33) to the housing (30). As shown in FIGS. 4 & 5 of the drawings, the cap (40) has an exterior surface (42) and an interior surface (41). Attached to the interior surface (41) is at least one retaining element (46). In certain embodiments, as shown in the drawings, the at least one retaining element (46) and a second retaining element (47) are attached to the interior (41) of the cap (40). Additionally, the cap (40) has an aperture (44) which extends from the exterior (42) surface of the cap (40) to the interior (41) surface of the cap (40). As shown in the drawings at FIGS. 5 & 7, the aperture (44) is located between the two retaining elements (46 & 47). A shaft-receiving bearing (44) lines the aperture (44). The cap (40) further consists of means (45) to attach the cap (40) over the opening (33) to the housing (30). In certain embodiments, as shown in the drawings, the cap (40) is attached to the housing (30) by one or more screws (49) which protrude through the exterior (42) surface of the cap (40) to the interior (41) surface of the cap (40) and into one or more threaded screw receptacles (39).

As shown in the drawings, this invention, in certain aspects, employs a probe element (11). In the initial biased position, when the apparatus is at rest, as shown in FIG. 1, the second end (13) of the probe element (11) is located close to, but a certain vertical distance above, the travelling surface (22). In one of the preferred embodiments, the distance from the second end (13) of the probe element (11) to the travelling surface (22) is approximately one inch (1.00" or 2.54 cm), as this distance allows for the normal vertical displacement and variations caused by minor irregularities in the travelling surface (22), or shifting in the vehicle (17), or variation in tire height during normal operation of the tire.

The probe element (11) is, in certain embodiments, an elongated element with a first end (12) and a second end (13). In one embodiment, the probe element (11) is mounted in a position perpendicular to the generally forward direction of travel (25) of the vehicle (17). The weight of the probe element (11) and gravity lends to the placement of the probe in a vertical position relative to the generally forward direction of travel (25) of the vehicle (17) and, generally, the travelling surface (22) or road. As a pneumatic tire (21) loses air pressure, the height of the tire (21) decreases; as the tire height decreases, the vertical displacement of the vehicle (17) above the travelling surface (22) decreases. When the vertical displacement of the vehicle (17) above the travelling surface (22) decreases sufficiently, the second end (13) of the probe element (11) contacts the travelling surface (22).

The probe element (11) functions by being displaced backwards, or in a direction opposite from the generally forward direction of travel (25) of the vehicle within a plane parallel to the plane of rotation of the wheel (26).

In another embodiment, the probe element (11) is an elongated element mounted at an acute angle relative to the perpendicular of the generally forward direction of travel (25) of the vehicle (17) and in a direction opposite from the generally forward direction of travel (25) of the vehicle (17) within a plane parallel to the plane of rotation of the wheel (26): in other words, the probe element (11) is pointed down and slightly rearward.

When a tire (21) on a vehicle (17) or a trailer (18) is properly inflated, the second end (13) of the probe (11) is suspended a distance slightly over the travelling surface (22). As a tire (21) loses air pressure, the height of the trailer (18) or vehicle (17) over the travelling surface (22) decreases. When the height decreases, the second end (13) of the probe element (11) engages the travelling surface (22). The loss of air pressure, whether sudden or gradual, of a sufficient quantity to negatively affects the vertical displacement of the vehicle (17) and may entail the degradation or disintegration of other vehicle elements at or near the wheel (26), axle (16) and tire (21). Thus, it is sufficient, as in this invention, that the motion of the probe element (11) be a simple matter of moving the probe element (11) to activate the electrical switching element (14). As the probe element (11) is either bent or flexed, the electrical switching element (14) is, ultimately, engaged, thus activating the alarm (19), thus alerting the operator (24) that a tire (21) is low or losing air pressure.

Figure 6:
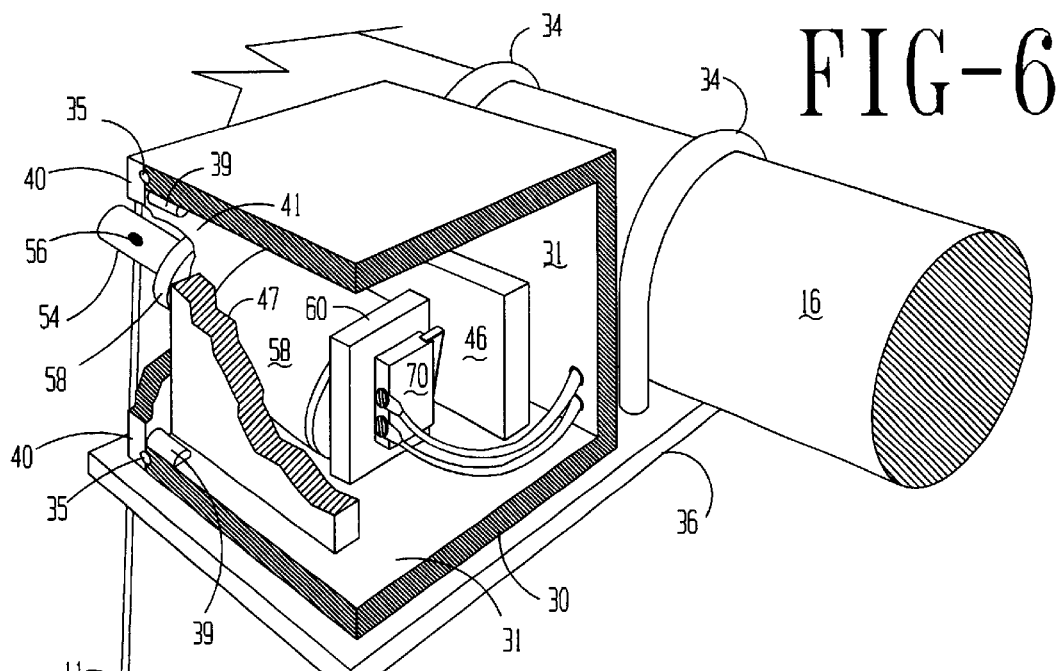
FIG. 6 is an isometric cut-away view of the details of the housing cap, detailing the relationship of the switch, mounting brackets, retaining elements and probe mounting shaft while in the rest position.

In one preferred embodiment, the probe element (11) further employs a dampening means (27) to dampen movement of the probe element (11). As the vehicle (17) travels along the travelling surface (22), the probe element (11) is subject to wind resistance. The probe element (11), therefore, is subject to forces that project the probe element (11) rearward, a direction opposite to the generally forward direction of travel (25) of the vehicle (17), thus engaging the alarm (19). To prevent the inadvertent actuation of the alarm (19), one preferred embodiment employs a dampening means (27) in the form of a helical coil in the midsection of the probe (11). In another embodiment, as shown in FIG. 6, the probe element (11) is a helical coil extending the entire length of the probe (11) from the first end (12) to the second end (13).

When a tire (21) loses air pressure, the height of the tire (21) decreases. When the height of the tire (21) decreases, the second end (13) of the probe element (11) contacts the travelling surface (22). As a result of friction, many metallic materials are prone to produce sparks when contacting the travelling surface (22). Because of the presence of flammable material, such as oil, gasoline, dry grass may be present on or near the road (22) or the underside of the vehicle (17), sparks generated pose a fire hazard. Thus, in one preferred embodiment, the second end (13) of the probe element (11) is made from a non-conductive material. The non conductive material may be made from a material which does not generate sparks when in contact with the travelling surface (22). One such material is ultra-high molecular polyethylene. In one embodiment, the ultra-high molecular polyethylene component is ⅜" in diameter and 3" in length. This ultra-high molecular polyethylene component has a low coefficient of friction when in contact with the travelling surface (22), thus reducing the creation of sparks which may ignite inflammable substances.

The first end (12) of the probe element (11), in certain embodiments, is attached to a shaft (50). As shown in the drawings, the first end (12) of the probe element (11) is inserted into a receiving sleeve (55) on the distal end (52) of the shaft (50). The receiving sleeve (55) extends transversely through the shaft (50). A securing element (56), in certain embodiments a screw, engages the probe (11) and securably holds the first end (12) of the probe element (11) in place and permits adjustment of the position of the probe (11) on the shaft (50). Adjustment of the position of the probe (50) along the shaft (50) permits the variation of the position of the second end (13) of the probe (11) over the travelling surface (22). Thus, the probe element (11) is adjustably attached so that the distance from the second end (13) of the probe (11) to the travelling surface (22) is adjustable. Variation of the height of the second end (13) of the probe (11) over the travelling surface (22) accommodates the variations in the size of the wheel (26), the size of the tire (21), and configurations of the vehicle (17) over the travelling surface (22).

In this invention, the probe element (11) is mounted in a position either: (a) perpendicular to the generally forward direction of travel of the vehicle; or, (b) at an acute angle relative to the perpendicular of the generally forward direction of travel (25) of the vehicle (17) and in a direction opposite from the generally forward direction of travel (25) of the vehicle (17). Positioning the probe element (11) in either of these two positions minimizes the damage to the components of the apparatus (10). When the probe (11) contacts the traveling surface (22) or another obstacle thereon, such contact is usually made at travelling speeds; the force against the probe element (11) can be both abrupt and severe. Because the probe element (11) needs only to move to activate the electrical switch (14), it is sufficient that the probe element (11) be able to move easily.

The shaft (50) extends through the cap (40) into the interior of the housing (30). The distal end (52) of the shaft (50) receives the first end (12) of the probe (11). The shaft (50) has a body (54) between the distal end (52) and proximal end (51). The body (54) of the shaft (50) extends through a bearing (57), which bearing (57) is mounted in an aperture (44) in the cap (40). The bearing (57) permits the shaft (50) to freely rotate about the longitudinal axis (53) of the shaft (50). As shown in FIG. 4, a shaft-retaining collar (58) securably holds the body (54) of the shaft (50) near the distal end (52) of the shaft (50) in place. The shaft (50) extends into the interior (41) of the cap (40). Located on the interior (41) of the cap (40) is the proximal end (51) of the shaft (50). At the proximal end (51) of the shaft (50) is mounted a bracket (60).

In certain embodiments, the bracket (60) has an upper surface (61), lower surface (62), at least two side surfaces (63) and at least one end surface (64). The planes of the upper surface (61) and lower surface (62) are parallel to one another and perpendicular to the longitudinal axis (53) of the shaft (50). The proximal end (51) of the shaft (50) is received in a cavity (65) which opens to the upper surface (61) of the bracket (60). A second securing element (66) extends through one of the side surfaces (63) of the bracket (60) and engages the proximal end (61) of the shaft (50), thus securing the attachment of the shaft (50) to the bracket (60).

An electrical switching element (14) is mounted upon the lower surface (62) of the bracket (60). In a preferred embodiment, the electrical switching element (14) is a Honeywell microswitch, model V7-2S17D6-201, which is mounted on the bracket (60). This particular switching element employs gold-plated contacts for use with low-voltage circuits, such as in this apparatus (10). A switch-engaging lever (72) is a part of the electrical switching element (14). The switch-engaging lever (72) protrudes from the switching element (14) beyond the plane of a first side surface (63) of the bracket (60). When the shaft (50) is rotated about its longitudinal axis (53), the bracket (60) is rotated around the center of the cavity (65) and the switch-engaging lever (72) contacts a the at least one retaining element (46). When the switch-engaging lever (72) contacts the at least one retaining element (46), the switch-engaging lever (72) moves and contacts the electrical switching element (14), thus engaging the switch and closing the electrical circuit (71) to actuate the electrical alarm (19).

In certain embodiments, the at least one retaining element (46) is a part of the cap (40). In other embodiments, the at least one retaining element (46) is either located within the interior (31) of the housing (30) or is a component of the interior (31) of the housing (30). One function of the at least one retaining element (46) is to provide a rigid surface for the switch-engaging lever (72) to engage the electrical switching element (70). Another function of the first retaining element (46) is to engage the bracket (60). When the bracket (60) is rotated to the point that the switch-engaging lever (72) engages the switch (70), further rotation of the bracket (60) is prevented by the at least one retaining element (46). Prevention of further rotation protects the switching element (70) from damage or wear that would otherwise be caused by the pressing of the switch-engaging lever (72) against the at least one retaining element (46).

In the operation of this apparatus (10), when the second end (13) of the probe (11) engages the travelling surface (22) or other obstacle on or near the travelling surface (22), the probe (11) rotates about the longitudinal axis (53) of the shaft (50) and in a direction opposite from the generally forward direction of travel (25) of the vehicle (17) and within a plane parallel to the plane of rotation of the wheel (26). The shaft (50) rotates and, in turn, rotates both the bracket (60) and the switching element (14) mounted thereon. The switch-engaging lever (72) engages the at least one retaining element (46) and engages the electrical switching element (14). If the probe (11) is subject to a force in excess of that needed to engage the switch (14), the bracket (60) prevents the switch (14) from being subjected to that excess force.

The apparatus of this invention is an improvement over the prior art, which teaches direct engagement of the ground-contacting element and electrical contact elements. Thus, in the prior art, the switching element is subjected to most of the force the ground-contacting element transfers to the switch, thus subjecting the switch to damage. As the switch is the most delicate, and usually the expensive, part of the apparatus, this invention improves upon the prior art by protecting the switch from those forces beyond what is necessary to engage the switch and engage the alarm.

Furthermore, in the normal course of operation, the probe element (11) is subject to force which exceeds that necessary to activate the alarm (19). The probe element (11) is a relatively inexpensive component of the apparatus (10), and is designed to be the element which is easily replaced or repaired. The shaft (50), bracket (60), and the at least one retaining element (46) are made of heavier and more durable materials than the probe element (11). Thus, in the normal course of operation, the probe element (11) suffers and absorbs most of the harsh forces as a result of striking the travelling surface (22) or obstacles thereon. When the forces endured are too great, the probe element (11) bends or breaks, and is replaceable or repaired. Therefore, the at least one retaining element (46), in conjunction with the cap (40) and housing (30), is designed to endure more force than is necessary for the probe (11) to either bend or break. The electrical switching element (14) is therefore protected.

A position-returning element returns the bracket (60), and switch (14) mounted thereon, to an original rest position. In certain embodiments, the position-returning element is a spring (73). The spring (73) engages one of the side surfaces (63) of the bracket (60) and pushes against the interior side (28) of a retaining element (46). In certain embodiments, the spring (73) may share a longitudinal axis with a guiding element (74). The guiding element (74) would be attached at one end to a side surface (63) of the bracket (60) and protrude through a channel through a retaining element (46) whereby the spring (73) pushes against bracket (60) and the interior of the at least one retaining element (46) simultaneously to bias the position of the bracket (60), switch (14), shaft (50) and probe (11) to the original rest position.

In certain embodiments, the cap (40) may further include a second retaining element (47). Mounted on the interior (41) of the cap (40) and on the other side of the bracket (60) from the at least one retaining element (46), the second retaining element (47) also prevents rotary motion of the bracket (60) in a direction opposite the direction of rotation that engages the electrical switching element (14). Like the at least one retaining element (46), the second retaining element (47) prevents the electrical switching element (14) from being damaged as a result of excess force being applied to the probe element (11).

The housing (30) has an interior (31), exterior (32), and an opening (33). The housing (30) is adapted to be positioned upon the axle (16) for the wheel (26) of the vehicle (17). Furthermore, the housing (30) has a mounting base (36) on the exterior (32) for a fixable attachment of the housing (30) upon the axle (16) for the wheel (26) of the vehicle (17). In certain embodiments, the housing (30) and cap (40) are made of an electrically non-conductive material, such as plastic. In certain embodiments, a resilient sealing means (35) is used between the housing (30) and cap (40) for hermetically sealing the interior (31) of the housing (30) to protect the electrical switching element (14).

The electrical switching element (14) is electrically attached to an electrically-powered alarm (19). The alarm (19) may be an audio-tone generator or a light-emitting means. The alarm (19) is activated when the probe element (11) moves from an initial biased position to a subsequent position. The subsequent position closes the electrical circuit (71) and activates the alarm (19). In certain embodiments, the electrically powered alarm (19) is an audio-tone-generator. In other embodiments, the electrically powered alarm (19) is a light-emitting electrical lamp.

This apparatus employs an electrical power source (23) to provide power to the electrically-powered alarm (19). In certain embodiments, the electrical power is provided by the accessory electrical outlet of a motor vehicle (17). In other embodiments, the electrical power is provided by wiring the apparatus (10) directly to the electrical system of the motor vehicle (17).

In certain embodiments, the apparatus further consists of at least one test circuit (67). The at least one test circuit (67) consists of at least one audio-tone-generator (68). In another embodiment, the test-circuit (67) consists of at least one light-emitting electrical lamp (69). The at least one test circuit (67) employs a display panel (75), which is generally located within the field of vision of the operator of the vehicle (17). The display panel (75) has at least one light-emitting electrical lamp (69) per apparatus (10) per tire (21). The display panel (75) has at least one audio-tone generator (68) per apparatus (10) per tire (21). By providing for separate alarms for each tire (21), an operator is alerted as to which specific tire (21) is failing. In order to activate the test circuit (67), certain embodiments of the apparatus (10) employ an electromagnet (76) mounted on either the second retaining element (47) or the interior (31) of the housing (30) diagonally opposite the spring (73) on the bracket (60). In one preferred embodiment, the electromagnet (76) is a round electromagnet sold by Dura Magnets, Inc., model ER1-101, a magnet 1" in diameter, ¾" in length. When the electromagnet (76) is engaged by a activating switch (77) on the display panel (75), the electromagnet (76) pulls the bracket (60). The action of pulling the bracket (60) towards the electromagnet (76) rotates the bracket (60) around the shaft (50), thus engaging the switch-engaging lever (72) with the at least one retaining element (46) thereby activating the electrical switching element (14) and activating the alarm (19) on the display panel (75). The activation of the alarm (19) apprises the operator that the electrical switching element (14) is ready to function properly.

The apparatus (10) is attached to the axle (16) of a two-axle, four tire travel trailer. The term "axle" includes a wheel-mounting assembly of a front-wheel-drive-train-driven vehicle. However, the apparatus (10) can be used on the axle (16) of any vehicle (17), be it a trailer, automobile, truck or other motorized vehicle with any number of tires or axles, with one lowtire indicator per side of each axle (16) or one low-tire indicator per tire (21). The mounting base (36) of the apparatus (10) is attached to the axle (16) by a mounting means (34) which may be at least one C-shaped clamp.

I claim:

1. An apparatus to indicate the presence of an under-pressurized pneumatic tire for a vehicle with an axle and a wheel, which said wheel rotates in a plane of rotation about the axle, and upon which said wheel the pneumatic tire is mounted, which said pneumatic tire supports the vehicle, which said pneumatic tire rides upon a travelling surface, and which both said pneumatic tire and said vehicle move in a generally forward direction of travel, comprising:

a housing, with an interior, exterior, a mounting base, and an opening adapted to be positioned next to the axle for the wheel of the vehicle, and having a mounting means on the mounting base for a fixable attachment of the housing upon the axle for the wheel of the vehicle, a cap, with an interior surface and an exterior surface,
        having an aperture which extends from the exterior surface to the interior surface, and
        means to attach the cap to the housing a shaft, with a proximal end, a distal end, a longitudinal axis, and a body, extending through the aperture of cap, a probe element,
        with a first end, attached to the distal end of the shaft, and
        with a second end, distal from the first end, a bracket mounted at the proximal end of the shaft, an electrical switching element, which is attached to the bracket, at least one retaining element for engaging the bracket and the electrical switching element, and an electrically-powered alarm,
        electrically attached to the electrical switching element by an electrical circuit.

2. An apparatus, as recited in claim 1, wherein the probe element is an elongated element mounted in a position perpendicular to the generally forward direction of travel of the vehicle.

3. An apparatus, as recited in claim 1, wherein the probe element is an elongated element mounted at an acute angle relative to the perpendicular of the generally forward direction of travel of the vehicle and in a direction opposite from the generally forward direction of travel of the vehicle.

4. An apparatus, as recited in claim 1, wherein the probe element further comprises a dampening means to dampen movement of the probe element, said movement being opposite from the generally forward direction of travel of the vehicle and said movement being within a plane parallel to the plane of rotation of the wheel.

5. An apparatus, as recited in claim 4, wherein the dampening means comprises a helical coil.

6. An apparatus, as recited in claim 1, wherein the probe element is adjustably attached to the shaft so that the distance from the second end of the probe to the travelling surface is adjustable.

7. An apparatus, as recited in claim 1, wherein the probe element is made from a non-conductive material.

8. An apparatus, as recited in claim 1, wherein the probe element is made from a material which will not generate sparks when in contact with the travelling surface.

9. An apparatus, as recited in claim 8, wherein the material is ultra-high molecular polyethylene.

10. An apparatus, as recited in claim 1, wherein the electrical switching element is activated by a movement of the probe element opposite from the generally forward direction of travel of the vehicle and within a plane parallel to the plane of rotation of the wheel.

11. An apparatus, as recited in claim 1, wherein the housing and cap are made of an electrically non-conductive material.

12. An apparatus, as recited in claim 1, wherein the housing and cap further comprise a resilient sealing means for hermetically sealing the interior of the housing to protect the electrical switching element.

13. An apparatus, as recited in claim 1, wherein the mounting means is at least one C-shaped clamp.

14. An apparatus, as recited in claim 1, wherein the axle includes a wheel-mounting assembly of a front-wheel-drive-train-driven vehicle.

15. An apparatus, as recited in claim 1, wherein the at least one retaining element is attached to the interior surface of the cap.

16. An apparatus, as recited in claim 1, wherein the at least one retaining element is attached to the interior of the housing.

17. An apparatus, as recited in claim 1, wherein the electrically powered alarm is an audio-tone-generator.

18. An apparatus, as recited in claim 1, wherein the electrically powered alarm is a light-emitting electrical lamp.

19. An apparatus, as recited in claim 1, further comprising a test-circuit comprising at least one audio-tone-generator.

20. An apparatus, as recited in claim 1, further comprising a test-circuit comprising at least one light-emitting electrical lamp.

21. An apparatus to indicate the presence of an under-pressurized pneumatic tire for a vehicle with an axle and a wheel, which said wheel rotates in a plane of rotation about the axle, and upon which said wheel the pneumatic tire is mounted, which said pneumatic tire supports the vehicle, which said pneumatic tire rides upon a travelling surface, and which both said pneumatic tire and said vehicle move in a generally forward direction of travel, comprising:

a housing, with an interior, exterior, a mounting base, and an opening adapted to be positioned next to the axle for the wheel of the vehicle,
having a mounting means comprising at least one C-shaped clamp on the mounting base for a fixable attachment of the housing upon the axle for the wheel of the vehicle, and
made of an electrically non-conductive material, a cap, with an interior surface and an exterior surface,
having an aperture which extends from the exterior surface to the interior surface,
means to attach the cap to the housing, and
made of an electrically non-conductive material a resilient sealing means for hermetically sealing the interior of the housing, a shaft, with a proximal end, a distal end, a longitudinal axis, and a body, extending through the aperture of cap, a probe element,
with a first end, attached to the distal end of the shaft,
with a second end, distal from the first end,
mounted at an acute angle relative to the perpendicular of the generally forward direction of travel of the vehicle and within a plane parallel to the plane of rotation of the wheel,
which is adjustably attached to the shaft so that the distance from the second end of the probe to the travelling surface is adjustable, and
which is made from a non-conductive material, such as ultra-high molecular polyethylene, which will not generate sparks when in contact with the travelling surface, and a bracket mounted at the proximal end of the shaft, an electrical switching element,
which is attached to the bracket, and
which is activated by a movement of the probe element opposite from the generally forward direction of travel of the vehicle and within a plane parallel to the plane of rotation of the wheel, at least one retaining element attached to the interior surface of the cap for engaging the bracket and the electrical switching element, and electrically-powered alarms,
electrically attached to the electrical switching element by an electrical circuit, comprising at least one light-emitting electrical lamp and at least one audio-tone generator.

* * * * *